United States Patent
Periyalwar et al.

(10) Patent No.: US 8,260,337 B2
(45) Date of Patent: *Sep. 4, 2012

(54) SYSTEM AND METHOD FOR PEER-TO-PEER COMMUNICATION IN CELLULAR SYSTEMS

(75) Inventors: Shalini Periyalwar, Nepean (CA); Hang Zhang, Nepean (CA); Nimal Senarath, Nepean (CA); Derek Yu, Kanata (CA); Kelvin Kar-Kin Au, Ottawa (CA); Karl Mann, Nepean (CA)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/013,228

(22) Filed: Jan. 25, 2011

(65) Prior Publication Data

US 2011/0201374 A1    Aug. 18, 2011

Related U.S. Application Data

(63) Continuation of application No. 12/465,304, filed on May 13, 2009, now Pat. No. 7,877,106, which is a continuation of application No. 10/815,717, filed on Apr. 2, 2004, now Pat. No. 7,548,758.

(51) Int. Cl.
*H04B 7/00* (2006.01)
(52) U.S. Cl. .... 455/517; 455/41.2; 455/502; 455/552.1; 370/329; 370/338
(58) Field of Classification Search ............ 455/517, 455/41.2, 502, 450–452.2, 552.1; 370/328, 370/338
See application file for complete search history.

(56) References Cited

U.S. PATENT DOCUMENTS

| | | |
|---|---|---|
| 5,539,730 A | 7/1996 | Dent |
| 5,603,081 A | 2/1997 | Raith et al. |
| 5,666,661 A | 9/1997 | Grube et al. |
| 5,794,142 A | 8/1998 | Vanttila et al. |
| 5,822,682 A | 10/1998 | Schroderus et al. |
| 5,907,794 A | 5/1999 | Lehmusto et al. |
| 5,913,171 A | 6/1999 | Solonen et al. |
| 5,987,011 A | 11/1999 | Toh |
| 5,995,500 A * | 11/1999 | Ma et al. ............ 370/337 |
| 6,484,027 B1 | 11/2002 | Mauney et al. |
| 6,522,877 B1 | 2/2003 | Lietsalmi et al. |
| 6,640,087 B2 | 10/2003 | Reed et al. |
| 6,678,341 B1 | 1/2004 | Miyake et al. |
| 6,807,165 B2 | 10/2004 | Belcea |
| 6,865,372 B2 * | 3/2005 | Mauney et al. ............ 455/41.2 |
| 6,879,574 B2 | 4/2005 | Naghian et al. |
| 6,954,446 B2 | 10/2005 | Kuffner |
| 6,961,575 B2 | 11/2005 | Stanforth |
| 6,965,767 B2 | 11/2005 | Maggenti et al. |
| 6,983,162 B2 | 1/2006 | Garani et al. |

(Continued)

OTHER PUBLICATIONS

Non-Final Rejection mailed Nov. 30, 2005, for U.S. Appl. No. 10/815,717, 15 pages.

(Continued)

*Primary Examiner* — Sharad Rampuria
(74) *Attorney, Agent, or Firm* — Meyertons, Hood, Kivlin, Kowert & Goetzel, P.C.

(57) ABSTRACT

Systems and methods are provided for delivering both PMP communications, for example standard cellular communications via a base station, and also delivering P2P communications, for example, communications between two mobile stations, using the same spectral resources for both types of communication.

19 Claims, 6 Drawing Sheets

U.S. PATENT DOCUMENTS

| | | | |
|---|---|---|---|
| 7,016,648 | B2 | 3/2006 | Haller et al. |
| 7,167,454 | B2 | 1/2007 | Caldwell et al. |
| 7,224,685 | B2 | 5/2007 | Proctor, Jr. |
| 7,230,930 | B2 | 6/2007 | Ahya et al. |
| 7,248,841 | B2 * | 7/2007 | Agee et al. .................. 455/101 |
| 7,280,836 | B2 * | 10/2007 | Fuccello et al. ........... 455/452.1 |
| 7,286,842 | B2 | 10/2007 | Li et al. |
| 7,295,528 | B2 | 11/2007 | Ibrahim et al. |
| 7,336,626 | B1 | 2/2008 | Barratt et al. |
| 7,548,758 | B2 * | 6/2009 | Periyalwar et al. ........... 455/517 |
| 7,646,752 | B1 | 1/2010 | Periyalwar et al. |
| 7,684,813 | B2 * | 3/2010 | Benson et al. ................ 455/517 |
| 7,809,386 | B2 * | 10/2010 | Stirbu .......................... 455/503 |
| 7,835,698 | B2 * | 11/2010 | Eyuboglu et al. ........... 455/63.1 |
| 7,877,106 | B2 * | 1/2011 | Periyalwar et al. ........... 455/517 |
| 7,885,243 | B2 * | 2/2011 | da Costa et al. .............. 370/338 |
| 8,111,675 | B2 * | 2/2012 | Kim et al. .................... 370/338 |
| 2002/0058502 | A1 | 5/2002 | Stanforth |
| 2002/0184311 | A1 | 12/2002 | Traversat et al. |
| 2003/0050090 | A1 | 3/2003 | Raffel et al. |
| 2004/0102215 | A1 | 5/2004 | Karr et al. |
| 2006/0068822 | A1 | 3/2006 | Kalhan |
| 2009/0010235 | A1 | 1/2009 | Huh et al. |
| 2009/0122774 | A1 | 5/2009 | Seok et al. |
| 2010/0067631 | A1 | 3/2010 | Ton et al. |
| 2010/0169961 | A1 | 7/2010 | Huh et al. |

OTHER PUBLICATIONS

Final Rejection mailed May 25, 2006, for U.S. Appl. No. 10/815,717, 19 pages.

Advisory Action mailed Aug. 15, 2006, for U.S. Appl. No. 10/815,717, 3 pages.

Non-Final Rejection mailed Nov. 16, 2006, for U.S. Appl. No. 10/815,717, 12 pages.

Non-Final Rejection mailed May 22, 2007, for U.S. Appl. No. 10/815,717, 12 pages.

Non-Final Rejection mailed Oct. 24, 2007, for U.S. Appl. No. 10/815,717, 11 pages.

Non-Final Rejection mailed Apr. 24, 2008, for U.S. Appl. No. 10/815,717, 11 pages.

Non-Final Rejection mailed Oct. 28, 2008, for U.S. Appl. No. 10/815,717, 12 pages.

Notice of Allowance mailed Mar. 6, 2009, for U.S. Appl. No. 10/815,717, 12 pages.

Non-Final Rejection mailed Jul. 15, 2010, for U.S. Appl. No. 12/465,304, 9 pages.

Notice of Allowance mailed Oct. 27, 2010, for U.S. Appl. No. 12/465,304, 7 pages.

* cited by examiner

SYSTEM AND METHOD FOR PEER-TO-PEER COMMUNICATION IN CELLULAR SYSTEMS

RELATED APPLICATIONS

This application is a continuation application of U.S. patent application Ser. No. 12/465,304 and claims the benefit thereof, which is a continuation application of U.S. patent application Ser. No. 10/815,717, which has issued as U.S. Pat. No. 7,548,758, and claims the benefit thereof, both of which are incorporated herein by reference.

FIELD OF THE INVENTION

The invention relates to peer-to-peer communications and to cellular communications.

BACKGROUND OF THE INVENTION

The need for peer-to-peer communication is becoming more prevalent with the emergence of new applications which involve geographically localized exchange of information. Currently, the support of cellular communications and peer-to-peer communications are enabled by separate systems, with dual function mobile stations operating exclusively in one mode or the other and utilizing separate spectrum, transceivers, etc.

SUMMARY OF THE INVENTION

According to one broad aspect, the invention provides a mobile station adapted to participate in wireless PMP (point to multi-point) communications using a cellular spectral resource, the mobile station being further adapted to participate in wireless P2P (peer to peer) communications using said cellular spectral resource.

In some embodiments, said cellular spectral resource comprises a downlink PMP band, and an uplink PMP band, wherein the mobile station is adapted to participate in wireless PMP (point to multi-point) communications using the downlink PMP band for receiving and using the uplink PMP band for transmitting, the mobile station being further adapted to participate in wireless P2P (peer to peer) communications using the PMP uplink band for both transmitting and receiving in a TDD (time division duplex) manner.

In some embodiments, a mobile station comprises: a transmitter for transmitting PMP communications and P2P communications on the uplink PMP band; a first receiver for receiving PMP communications on the downlink PMP band; a second receiver for receiving P2P communications on the uplink PMP band.

In some embodiments, a mobile station is adapted to listen to PMP communications from the network on the downlink PMP band with the first receiver for maintenance purposes while transmitting P2P communications and while receiving P2P communications with the second receiver.

In some embodiments, a mobile station comprises: transmitter for transmitting PMP communications and P2P communications on the uplink PMP band; a receiver for receiving PMP communications on the downlink PMP band, and for receiving P2P communications on the uplink PMP band.

In some embodiments, a mobile station is adapted to listen to PMP communications from the network on the downlink PMP band for maintenance purposes only while transmitting P2P communications.

In some embodiments, said receiver is a software defined receiver.

In some embodiments, a mobile station is further adapted to maintain linked state transitions between states for PMP communications and at least one state for P2P communications.

In some embodiments, the states for PMP communications comprise dormant, standby and active, and wherein P2P communications are permitted when the mobile station is in one of the PMP states dormant and standby.

In some embodiments, a mobile station is adapted to periodically interrupt P2P communications to perform maintenance for PMP communications.

In some embodiments, a mobile station is adapted to transition into P2P communications independent of network control.

In some embodiments, a mobile station is adapted to transition into P2P communications independent of network control by directly coordinating a setup of a P2P communications link with another mobile station.

In some embodiments, a mobile station is adapted to coordinate the setup of a P2P communications link with another mobile station by: in response to a user selection, transmitting a P2P request to the another mobile station on a P2P access channel; receiving an acknowledgement from the another mobile station.

In some embodiments, a mobile station is adapted to transmit a frame format which includes a time slot for PMP communications and a time slot for P2P communications.

In some embodiments, a mobile station is adapted to transition into P2P communications under network control.

In some embodiments, a mobile station is adapted to transition into P2P communications under network control transparent to a user of the mobile station.

In some embodiments, a mobile station is adapted to: receive a direction from the network to enter P2P communications with another mobile station; in response to said direction, coordinate set up of P2P communications with the another mobile station; while in P2P communications, listen to PMP transmissions from the network for maintenance purposes.

In some embodiments, both P2P communications and PMP communications are CDMA-like communications.

In some embodiments, a mobile station is further adapted to perform signalling to set up P2P communications with another mobile station using an access channel having a defined long code mask announced by a network controlling said spectral resource.

In some embodiments, a mobile station is adapted to use a first long code mask for P2P transmissions to another mobile station, and a second long code mask for PMP communications to the network.

In some embodiments, a mobile station is further adapted to perform at least one of rate control and power control for P2P communications in cooperation with the other mobile station.

In some embodiments, a mobile station is further adapted to perform at least one of rate control and power control for P2P communications under control of the network.

In some embodiments, a mobile station is adapted to initiate P2P communications with a default power, and to request authorization to use additional power and/or channel resources from the network should P2P communications not be successful.

In some embodiments, a mobile station further comprises at least one steerable antenna which is steered for use in P2P communication or PMP communications.

According to another broad aspect, the invention provides at least one network element adapted to participate in PMP communications with a plurality of mobile stations, the at least one network element being adapted to: determine when a pair of mobile stations which are communicating with each other are sufficiently close together for P2P communications; direct the pair of mobile stations to start communicating with each other using P2P communications.

In some embodiments, a cellular network comprises the at least one network element as summarized above.

In some embodiments, the at least one network element comprises a base station transceiver which determines a pair of mobile stations which are communicating with each other are sufficiently close together for P2P communications due to their being located in a coverage area serviced by the base station transceiver.

In some embodiments, the at least one network element comprises a base station controller and a plurality of base stations which determine a pair of mobile stations which are communicating with each other are sufficiently close together for P2P communications due to their being located in a coverage area of base stations serviced by the base station controller.

In some embodiments, a cellular network is adapted to send and transmit CDMA-like signals.

According to another broad aspect, the invention provides a method comprising: a mobile station participating in wireless PMP (point to multi-point) communications using a cellular spectral resource; the mobile station participating in wireless P2P (peer to peer) communications using said cellular spectral resource.

In some embodiments, said cellular spectral resource comprises a downlink PMP band, and an uplink PMP band, wherein the mobile station participates in wireless PMP (point to multi-point) communications using the downlink PMP band for receiving and using the uplink PMP band for transmitting, the mobile station participates in wireless P2P (peer to peer) communications using the PMP uplink band for both transmitting and receiving in a TDD (time division duplex) manner.

In some embodiments, a method further comprises: the mobile station listening to PMP communications on the downlink PMP band for maintenance purposes while transmitting P2P communications and while receiving P2P communications.

In some embodiments, a method further comprises: maintaining linked state transitions between states for PMP communications and at least one state for P2P communications.

In some embodiments, a method further comprises: receiving a direction from the network to enter P2P communications with another mobile station; in response to said direction, co-ordinating set up of P2P communications with the another mobile station; while in P2P communications, listening to PMP transmissions for maintenance purposes.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Embodiments of the invention provide an efficient means of P2P (peer-to-peer) operation within a cellular system, by reusing the spectrum and some of the transceiver hardware for both modes of operation. Some embodiments provide a degree of network control for P2P operation so as to enable Authentication, Authorization, Accounting (AAA), billing, etc.

P2P operation is particularly beneficial when the users exchanging information are within the same geographical area. For example, two users within a conference room may wish to exchange a file. This can normally be achieved by utilizing conventional cellular communications, where the file exchange involves the flow of data through the entire network (MS(mobile station)-BS(base station)-BSC(base station controller)-BS-MS if within the same BSC), or utilizing a separate P2P mode of operation where each user is required to have WLAN (wireless local area network) or alternate hardware that enables such operation on different spectrums. Alternatively, other networks having different network infrastructure may be employed. For example, for UMTS, the path might be UMTS UE-Node B-RNC-GGSN-RNC-NodeB-UE. While the terminology used below is CDMA specific in some instances, embodiments of the invention have broader applicability.

In contrast, embodiments of the invention provide a solution where P2P operation is integrated with the cellular system access. As a result, the overall cellular system efficiency is improved relative to the conventional systems. The use of P2P in place of the first option introduced above, i.e. MS-BS-BSC-BS-MS flow, results in a reduced load on network resources and greater operational efficiency both from the network as well as the terminal perspective (terminals operate at lower power to communicate with a user in close proximity). In place of the second option above, namely utilizing separate hardware on separate spectrums, the use of P2P integrated with cellular would be more economical, by enabling better spectrum efficiency (reusing cellular spectrum) as well as hardware efficiency (reusing cellular hardware). In addition, some embodiments provide the operator with a means to manage the users' P2P communications under the same cellular network configuration for administrative and security functions. Another benefit of having P2P enabled terminals is that the P2P function may come in handy for emergency situations, such as when a cell site/network goes down due to a calamity.

Figure 1B:
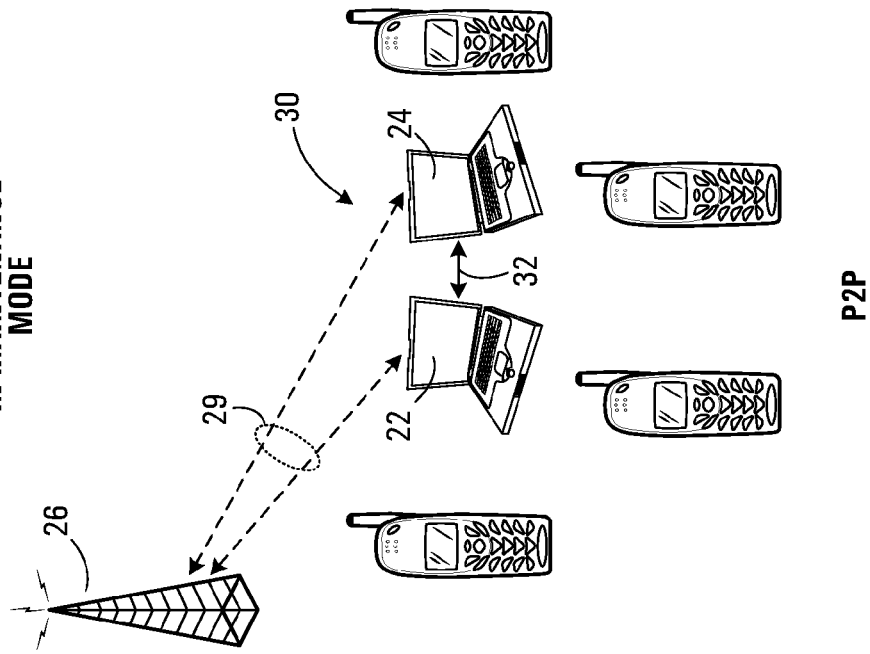
FIG. 1B is a schematic diagram of two mobile stations communicating in P2P (peer-to-peer) mode in accordance with an embodiment of the invention.
Figure 1A:
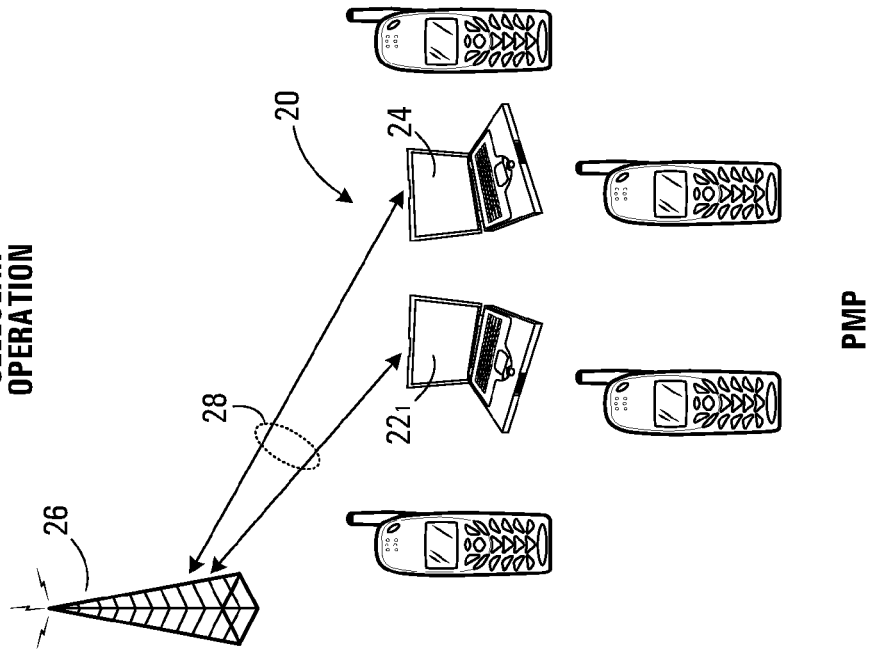
FIG. 1A is a schematic diagram of two mobile stations communicating in PMP (point to multipoint) mode.

The concept of overlaying P2P operation onto a cellular system is illustrated in FIGS. 1A and 1B. Using the conventional cellular spectrum, and with the knowledge of the cellular network, two users may switch to P2P operation to exchange files in a P2P enabled cellular system, while still maintaining connectivity with the cellular network.

To begin, normal cellular operation is indicated generally by 20 in FIG. 1A. Two users are shown with mobile stations 22,24 communicating with a cellular network generally indicated by 26 using normal cellular communications 28. It can seen that if a significant amount of traffic between the two mobile stations 22,24 is to take place, a lot of system resources would be employed. The P2P mode is generally indicated by 30 in FIG. 1B. Here, the two user mobile stations 22,24 communicate with each other directly as indicated by wireless link 32 which employ the same spectrum as would be employed for normal cellular operations. Preferably, the wireless links to the network 26 are not entirely dropped, but are used in a maintenance mode 29. The P2P communications 32 may be independently controlled by the mobile stations involved with the communication, and/or can be networked controlled. The P2P communications may be unicast communications in some embodiments, and/or multicast communications. P2P transmissions may be power and/or rate controlled.

Linked State Transitions

Figure 2:
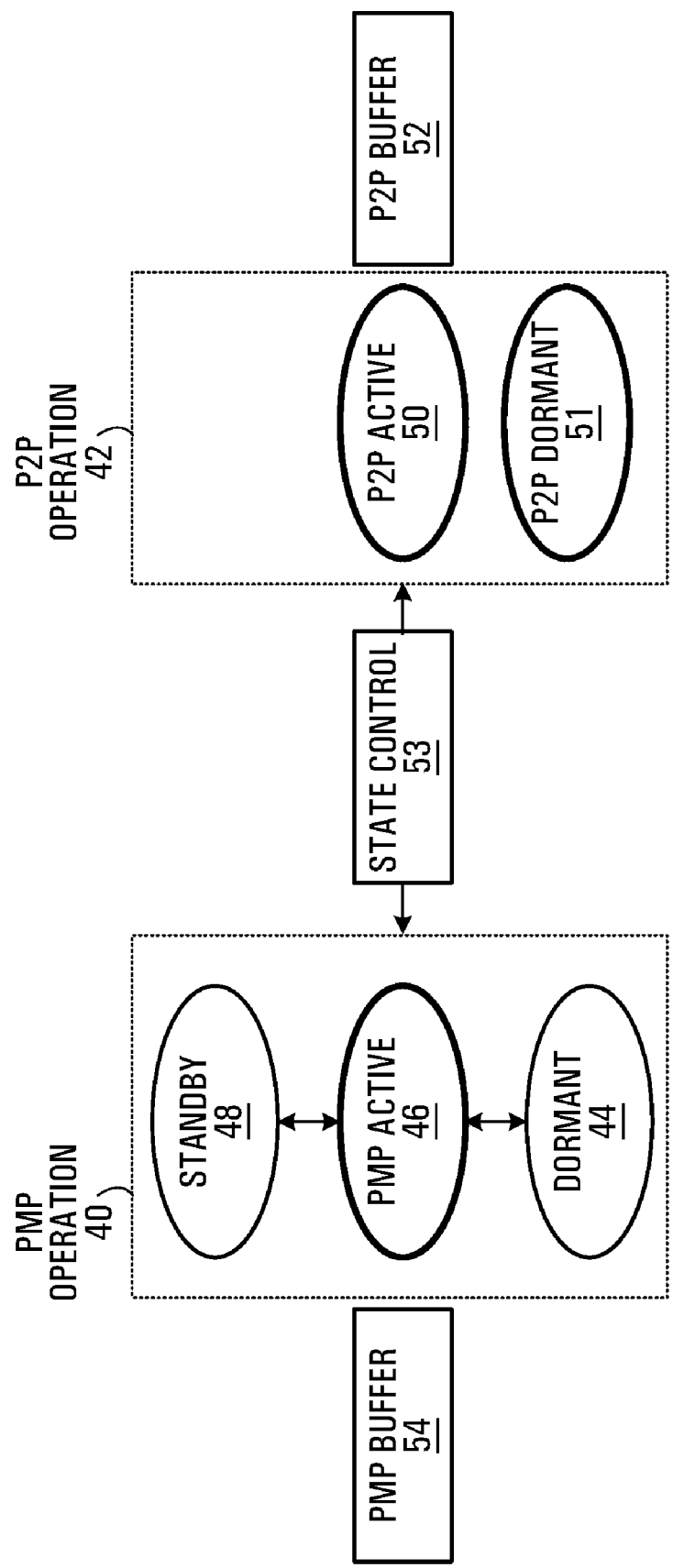
FIG. 2 is a diagram showing linked state transitions for PMP and P2P states.

In some embodiments, linked state transitions are used to enable both cellular and P2P communication with the same cellular spectrum and reuse MS resources. A respective state is maintained for cellular (also referred to as point to multipoint, or PMP) operation and for P2P operation. FIG. 2 illustrates an example of a simplified state transition scheme, where the state transitions are shown for both cellular communications (denoted as PMP) generally indicated at 40 as well as for P2P communications at 42. These state transitions are linked by state control 53 which is responsible for ensuring PMP operation and P2P operation are functioning together properly.

The states shown for PMP operation include dormant 44, active 46 and standby 48. These are the standard states defined for cellular operation by CDMA 1XEV-DV standards. When a mobile station is in the active state 46, the mobile station is involved with a traffic exchange over the cellular network. The states shown for P2P operation include P2P active 50 and PMP dormant 51.

In some embodiments, the PMP active 46 and the P2P active 50 states are mutually exclusive. This means that the PMP state must transition out of PMP active state 46 before the P2P active state 50 can occur. Similarly, if the mobile station is in P2P active state 50, then it must transition out of that state in order to go into PMP active state 46.

When the MS enters a dormant 44 or standby 48 state in the cellular mode of operation, it can begin operation in a P2P mode. This involves a transition from either dormant 44 or standby 48 into P2P active 50. The PMP state of dormant or standby 44,48 is maintained. The mobile station may transition out of P2P active state 50 to P2P dormant state 51 voluntarily, or alternatively the MS's transition out of P2P active state 50 may be triggered by the network control. This may for example occur if there is a need to go into PMP active state 46, i.e. if a regular cellular communication is to take place. A P2P buffer 52 may be provided to retain incomplete P2P transmissions until the next opportunity for P2P communication arises. In some embodiments, the cellular operation can also be overridden by P2P operation by forcing the MS into a dormant/standby state 44,48. If this occurs, incomplete transmissions for PMP communications may be stored in a PMP buffer 54. State information and data are stored in separate buffers so as to resume operation when returned to respective P2P or cellular active state.

The state transition scheme discussed above is a simple design to illustrate the concept. More efficient and/or more complex schemes may be implemented as appropriate depending on the practical requirements. One of the variants may be to design the P2P states to include multiple states. Another variant may be to allow best effort based communication link in either PMP or P2P mode while engaged actively in the other mode. This needs the maintenance of two or more active sessions at a given time.

Furthermore, a downlink intensive PMP link could be easily continued as the mobile station transmitting in P2P mode could listen to the downlink while in P2P mode. Additional states may be defined to implement such schemes.

All the illustrations below assume the simple state transition scheme proposed in FIG. 2.

Reuse of Cellular Spectrum

Typically, cellular systems operate in FDD (frequency division duplex) mode meaning separate spectrum is used for each of forward link traffic and reverse link traffic. According to the invention, the cellular spectrum is reused for P2P communications. In a preferred embodiment the reverse link cellular frequencies are reused for P2P transmissions. Preferably, the use of uplink also takes advantage of link appropriate modulation (e.g., long code versus Walsh code in CDMA). This enables the reuse of the reverse link transmitter at the MS. In this embodiment, there needs to be a capability to receive the reverse link transmissions at a mobile station, something that would not normally be possible. In one embodiment, each mobile station is further equipped with a reverse link receiver. In another embodiment, each mobile station is configured to include a software defined receiver (SDRx), and the personality of the MS receiver can be changed from FL Cellular Receive to RL P2P Receive mode.

Transceiver Reuse

Figure 3:
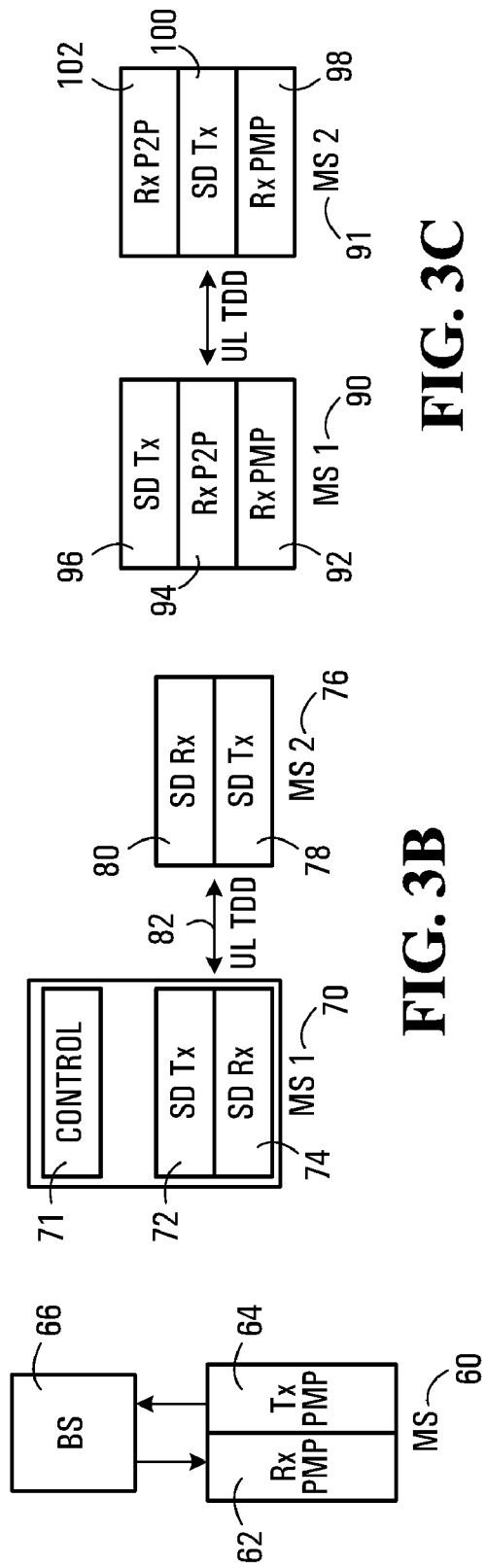
FIG. 3A shows a mobile station in conventional PMP mode.
FIG. 3B shows two mobile stations communicating in P2P mode using software defined receivers, in accordance with an embodiment of the invention.
FIG. 3C shows two mobile stations communicating in P2P mode using dedicated receivers for P2P communications.

FIGS. 3B and 3C illustrate two possible options for the MS transceiver. In FIG. 3A, a MS 60 has the conventional transceiver for cellular operation. This includes Rx PMP functionality 62 for receiving signals from the BS 66, and Tx PMP 64 for transmitting signals to the BS 66.

In some embodiments, at least the receiver is configured to be a software defined receiver, as discussed above. In a software defined receiver, one can change the requisite personalities (carrier frequency, codes, etc.) such that the single receiver can behave either in Rx PMP mode to receive transmissions over the normal downlink frequencies from the base station, or in Rx P2P mode during which it receives signals from another mobile station, but on the reverse link frequencies normally received by the base station 66. Using the language from the previously introduced linked state transitions of FIG. 2, the software defined (SD) receiver operates either in cellular mode when in cellular active state or in P2P mode when in P2P active state.

FIG. 3B illustrates the transceiver functionality for the embodiment featuring a software defined receiver. A first mobile station 70 has transmit functionality 72 and software defined received functionality 74. The transmit functionality 72 may be substantially similar to the Tx PMP 64 of the conventional mobile station 60 of FIG. 3A with the exception of the fact that different frame formats may be employed for the P2P mode as opposed to the PMP mode. FIG. 3B also shows a second mobile station 76 which is similarly equipped. The two mobile stations 70,76 then communicate with each other using the single reverse link band. Since they are using the same band, the communication must be time division duplex. This P2P uplink TDD communication is generally indicated by 82. This TDD operation is in contrast to the conventional FDD operation of the mobile station 60 of FIG. 3A, and provides a reason for using a different frame format for P2P operation as opposed to PMP operation. Each of the mobile stations also has a control function. Only the control function 71 of FIG. 3B is illustrated.

Depending on a given implementation the scope of the software defined radio functionality may involve changing of MS transmitter parameters to suit P2P operation on the reverse link in a time divided format. The air interface configuration for RL Transmit on cellular versus RL Transmit on P2P will be somewhat different in frame formats, since the latter requires a time division mode of operation on the same RL frequency for both transmit and receive functions. The RL transmitter needs minor modification to change to the requisite modes for cellular or P2P. Preferably, the MS transmitter always remains on same RL frequency. The biggest change involves receiver modifications to allow RL reception in P2P mode from another MS versus FL receive from the BS in cellular, requiring a change of both carrier frequency as well as required receiver processing to match the air interface parameters as needed. The carrier frequency changes to the appropriate RL frequency, i.e., corresponding to the transmitting RL frequency of the peer MS. Note that if the two MSs are with different frequency carriers or with different operators, their UL frequency carriers may be different, and the receiver has to adapt its receiving frequency to that of the peer MS's transmit RL frequency.

In another embodiment a transmitter is provided along with an explicit P2P receive chain for P2P operation such as shown in FIG. 3C. This alternative has benefits in that one of the receiver chains is always tuned to the cellular FL, so as to enable continuous monitoring of the cellular maintenance channels. In some embodiments, the MS antennas are steerable and the MS directs its antenna appropriately, for optimizing/enhancing/improving the P2P link or the cellular link to the BS. An example of this is shown in FIG. 3C. Shown is a first mobile station 90 communicating with a second mobile station 91 using the uplink frequencies in TDD mode. The first mobile station 90 has separate receiver hardware 92 for receiving in Rx PMP mode, and separate hardware 94 for receiving in Rx P2P mode. The mobile station 90 also has transmitter 96. In some embodiments, the transmitter may be software defined at least to the extent that different frame formats are configurable so as to allow both P2P and PMP activities. Similarly, a second mobile station has Rx PMP hardware 98, transmit functionality 100 may be at least partially software defined, and Rx P2P functionality 102.

The illustrations of FIGS. 3B and 3C are highly abstract. A given mobile station will of course be equipped with any hardware and/or software required to enable the mobile station to participate in its regular PMP communications. This hardware and/or software will vary depending upon the particular type of PMP communications involved. In some preferred embodiments, the PMP communications are CDMA communications, for example as defined in any one of a number of CDMA standards including, but not limited to 1XEV-DO, 1XEV-DV, UMTS HSDPA. Typical functionality will include transmitter, receiver and a control function, and of course user interface functions such as speaker, microphone, etc. Most of this functionality is not relevant to the invention and has been omitted from the figures and description in the interest of clarity. The control function in a conventional mobile station is responsible for maintaining the state of the mobile station, for example the enhanced control hold, dormant and active states for 1XEV-DV described above with respect to FIG. 2. In mobile stations provided by the invention, the control function is expanded to include the additional ability to switch between P2P mode, PMP mode, and to control the PMP mode. This additional control functionality may be implemented by modifying existing control function software, and/or by providing additional hardware and/or software. The control function might for example be implemented as a microprocessor or FPGA, either generic or custom, together with software and/or firmware. However, any appropriate control implementation is contemplated.

P2P Operation

In one embodiment, P2P operation between MSs is independent user initiated P2P communications without BS involvement in establishing the P2P connection. This does not require P2P users to be communicating with the same BSC (e.g., users in the same room may be connected to different BSCs).

In another embodiment P2P operation between MSs is network controlled. In this embodiment, the network leverages the P2P feature to improve radio resource efficiency, when it detects those users exchanging data are within the same BSC area. The level of network control, and the limitations imposed by network control may differ from one implementation to another. For example, in a cellular network which has a network infrastructure different from the MSC (mobile switching centre), BSC, BTS hierarchy employed in the embodiments described herein, there may be different limitations on when two mobile stations are permitted to communicate in P2P mode.

It is contemplated that a given implementation may allow both independent and network controlled P2P operation, or just one of independent and network controlled P2P operation.

P2P Operation in Independent Mode

As discussed above, with independent P2P mode collocated or close by MSs can initiate P2P operation in a cellular system which has P2P enabled. For this purpose, a P2P access channel is provided through which the users may attempt to establish initial P2P link setup. Preferably, this P2P access channel is defined as part of the system's air interface. Once a MS receives a request for a P2P connection from another MS, it can acknowledge the request, and a power requirement assessment process is invoked by both the mobile stations. This may be as simple as setting up the P2P connection using a default power setting. For this purpose, preferably a maximum power limit much lower than the normal uplink transmit power is provided to a mobile station. This is possible because two mobile stations operating in P2P mode will always be much closer together than the maximum distance between a mobile station and a base station which are communicating together each in standard cellular communications. In some embodiments, if communication fails using a default power and channel resources, one or both of the MSs could make a request from the network to obtain a higher power quota and/or additional channel resources, and establish a link as indicated under the network control mode discussed below. If direct communication fails even in this mode, the mobile station may decide to communicate using the cellular mode.

Assuming the simple state transition diagram of FIG. 2, the MSs can attempt a P2P connection while in dormant or standby state. It is of course to be understood that the state transition diagram of FIG. 2 is but one example. Depending upon the state transition diagram for a given implementation, there may be different sets of states during which mobile stations can or cannot attempt P2P connections.

Figure 4:
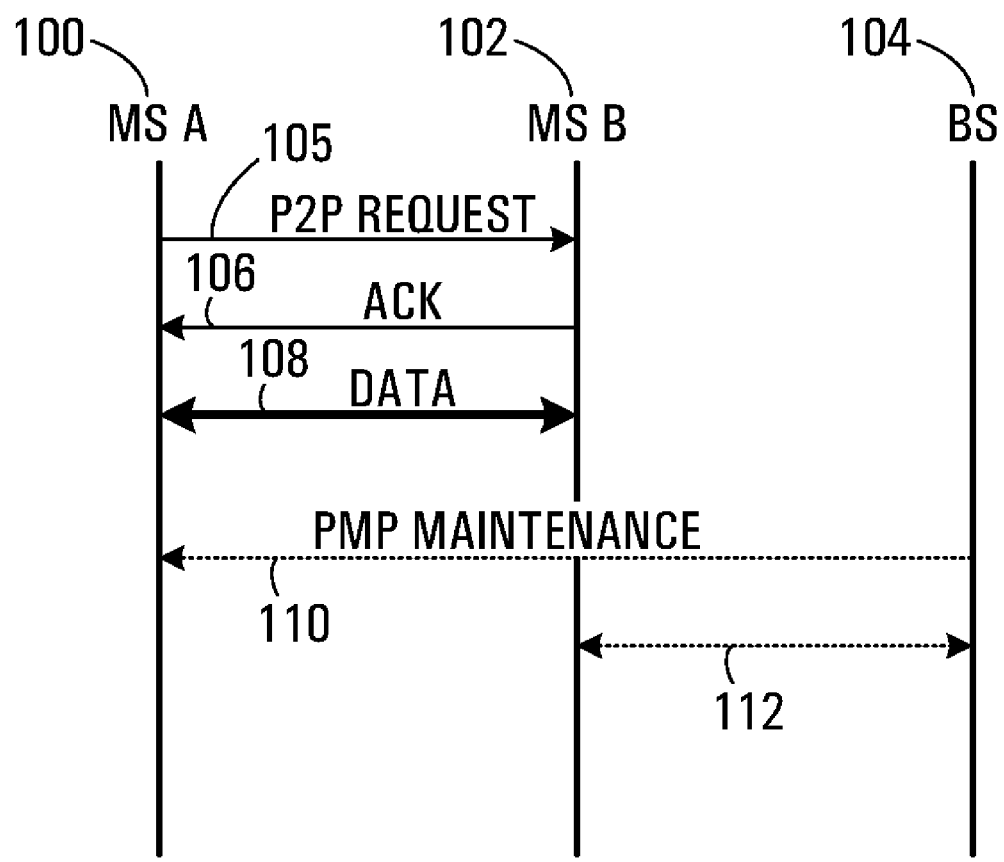
FIG. 4 is an example of a sequence of events leading to independently initiated P2P communications.

FIG. 4 illustrates an example of the operation in the independent mode. MS B 102 actively listens to P2P control channel for P2P request 105 from MS A 100. When it detects MS A's address it responds with an ACK 106. Following acknowledgement 106, the two mobile stations MS A 100 and MS B 102 then communicate with each other in P2P mode as indicated at 108. Preferably, the MSs periodically return to the original cellular state (Dormant/Standby) for maintaining the cellular connection (e.g., sync, paging channel). This is illustrated in the example of FIG. 4 with PMP maintenance 110 between MS A 100 and the base station 104, and PMP maintenance 112 between MS B 102 and the base station 104.

A very specific signalling example for independent P2P operation has been described with respect to FIG. 4. The various messages may be sent using any appropriate mechanism such as an access channel for P2P operation. More generally, the signalling performed between two mobile stations to set up P2P operations may very from one application to another and is certainly not limited to the particular example of FIG. 4. In this case, there is no direct involvement of the network in the P2P operation. The access channel could be a common channel similar to the RACH in 3GPP systems. However any appropriate access channel is contemplated.

Independent P2P Operation Example

The following steps illustrate a detailed example of the independent P2P operation assuming the users are able to communicate with a default power level available for the P2P independent mode discussed above. In this example, it is assumed that P2P mode communications are initially set up, and then a first mobile station followed by a second mobile station are respectively transitioned from P2P operation to PMP operation and back again. The purpose of this example is to show how a cellular mode connectivity may preempt P2P mode activity. It is of course to be understood that in a given operational scenario, the sequence of events described below will not necessarily take place since this assumes the particular scenario where in the first mobile station is interrupted followed by the second mobile station. The example sequence of events follows:

1) Both users switch to P2P mode for file exchange; 2) mobile stations MS A and MS B listen to P2P access channel;
3) when successful, mobile stations perform handshake;
4) users commence communication in P2P mode:
   a) MSs receiver retunes to RL frequency channel;
   b) MSs communicate with each other over RL frequencies at low power; and
   c) MSs operate on RL in TDD mode;
5) MSs continue to maintain cellular mode connectivity;
6) MS A is interrupted by a FL transmission request:
   a) MS A stops P2P communication with "pause" message to MS B;
   b) excess P2P data packets are stored in P2P data buffer in MS A and MS B; and
   c) MS A returns to cellular active state;
   d) when MS A returns to FL Standby or dormant state (more generally, when MSA no longer requires resources for regular cellular communication, and is available again for P2P mode communications), reattempts connection to MS B on P2P access channel;
   e) meanwhile, MS B has entered cellular active state;
   f) MS A continues to reattempt P2P access;
   g) MS B returns to Standby/dormant; resumes P2P attempt;
   h) MS A and MS B resume P2P mode until action is completed;
   i) users turn off P2P mode until next needed; and
   j) MSs return to normal cellular mode operation.

In the example above, it is assumed that the regular cellular mode activity will take precedence over P2P mode activity. In some embodiments, it will be a user configurable parameter, either on an ongoing basis or on a per use basis, which stipulates which type of connectivity takes precedence. In this way, users may switch to P2P mode and complete a file transfer without repeatedly being interrupted for cellular communications.

Preferably the mobile stations periodically retune to the regular cellular downlink communications frequencies to enable them to listen to conventional base station commands for example while in the standby or dormant state. The mobile stations can also use the uplink channel to transmit maintenance messages to the base station. Depending upon a given implementation, different mechanisms may be employed to distinguish between uplink transmissions to the base station, and transmissions using the uplink frequencies to another mobile station in P2P mode. Examples are given below for CDMA systems, but alternative measures may be employed to achieve this effect.

P2P Operation in Network Controlled Mode

In these embodiments, the network is in control of P2P mode. In one embodiment, the BS itself makes the decision to initiate P2P communications between two MSs triggered by realizing the benefits of P2P operation between 2 MSs exchanging data within its cell, or in adjacent cells in the BSC. If the user locations within the cell are available, the network correlates this information with users connected to each other within the cell(s). The network advises users to attempt connection by allocating a P2P access channel for this purpose. When the users report a successful handshake, the network transfers the users to P2P mode.

In network controlled mode, the network is responsible for making the decision for two mobile stations to enter P2P mode. Depending upon a given network implementation, this decision may be made by any number of network elements. For example, in a network featuring the above introduced MSC, BSC, BTS hierarchy, this responsibility might rest with the BSC which would allow P2P communications between MSs located in different cells, or with the BTS which would restrict P2P communications to be within a given cell. However, the network infrastructure for coordinating this may rest in a single network element or in a combination of network elements. In preferred embodiments, the only change to existing networks is to introduce a few additional signaling messages to enable the network to instruct MSs to enter P2P mode. Examples of a few such messages are given below in FIG. 5, but these are only a particular example. It is to be understood that many methods of a network coordinating two MSs to enter P2P mode may be implemented within the scope of the invention insofar as network controlled P2P is concerned. Preferably, this additional messaging is implemented as an extension to existing software and/or hardware which is providing the cellular connectivity and control.

For embodiments which make use of location information, various existing techniques may be used to determine the mobile station location. For example, most systems currently do have some location determining ability to enable 911 services. Furthermore, if a mobile station is active within the network, it will be possible to know which cell the mobile station is operating in. Other methods of determining mobile station are also contemplated. For example, mobile stations equipped with GPS technology may inform the network of their locations. The details of the mechanism for determining the location of the mobile stations are outside the scope of this invention.

Preferably, for embodiments featuring network control, some form of power control is implemented to ensure that P2P communications do not interfere with other communications. It may at the same time be possible to increase power to a level which might provide enhanced performance. In one embodiment, a basic default power limit is prescribed by the network.

If the MSs fail to access each other directly with the basic power limits allocated for this mode, in some embodiments they may request for exclusive power levels and/or other resources such as exclusive channels, to establish the communication link. It should be noted that these specific resources are only for one way communication and the resources are the reverse link resources. Depending on the mobile location, higher rates could be used by the mobile stations for direct communication and as such, even with this reverse link allocation, P2P mode can lead to significant savings in the resources.

If the mobile stations fail to establish a good communication link even after these grants, the network continues the standard cellular mode of operation. Note that in preferred implementations all of these actions are transparent to the users.

If the communication fails after establishment of the P2P mode due to fading of signals or movement of the mobile stations, they may be switched back to the cellular mode immediately.

Figure 5:
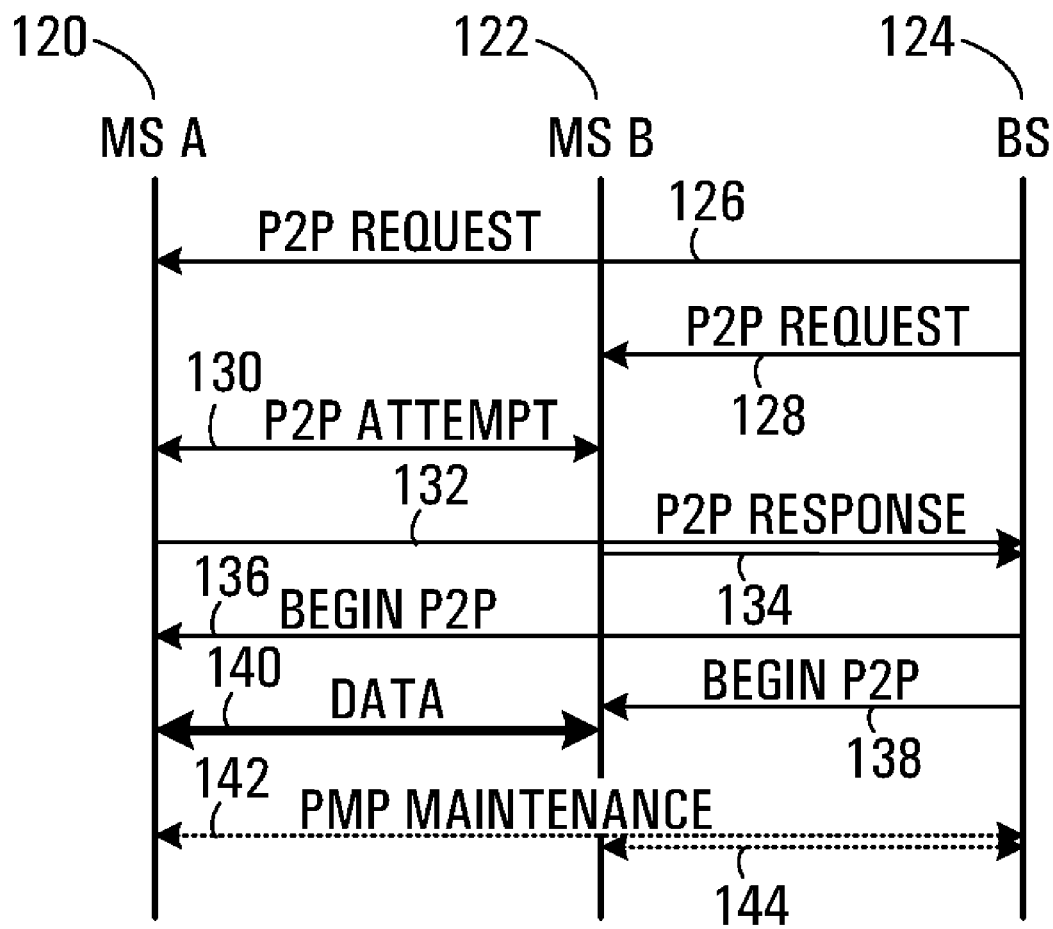
FIG. 5 is an example of a sequence of events leading to network controlled P2P communications.

FIG. 5 illustrates an example of the network controlled P2P operation. This example of P2P operation assumes the users are able to communicate with a default power level specified for this purpose. This example shows P2P communications between a first mobile station 120, hereafter MS A and a second mobile station 122, hereafter MS B as coordinated by a base station 124. The operation begins with the base station sending a message to each of the two mobile stations 120,122 recommending that they transition into P2P mode operation. In the illustrated example, this is shown as P2P request message 126 from BS 124 to MS A 120, and P2P request message 128 from the BS 124 to MS B 122. In response to these messages, the mobile stations 120,122 attempt to connect via P2P as indicated at 130. In the event there is success, the two mobile stations 120,122 send respective messages to the base station 124 to indicate success. In the illustrated example, this consists of P2P response messages 132,134. In response to this, the base station 124 acknowledges the response messages with begin P2P message 136 to MS A 120 and begin P2P message 138 to MS B 122. Following this, the mobile stations 120,122 proceed with P2P communications as indicated at 140. Preferably, both mobile stations 120,122 periodically return to the original cellular state (for example dormant or standby) for maintaining these cellular connections (for example for synchronization timing, etc. and for receiving paging messages). In the network control operational mode, preferably all of these operations are transparent to the user.

Maintaining Cellular Connectivity

Preferably, P2P capable MSs return to cellular mode for cellular link maintenance so as to be in a position to respond to any commands from the cellular network, such as a page. Various methods of achieving this maintenance function will be described below, but other methods may be used without departing from the scope of the invention.

Figure 6A:
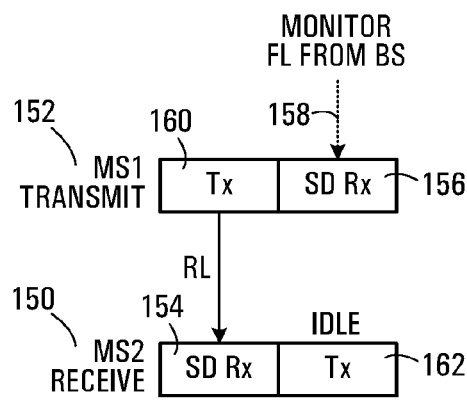
FIG. 6A is an example of a first method of monitoring BS communications.
Figure 6B:
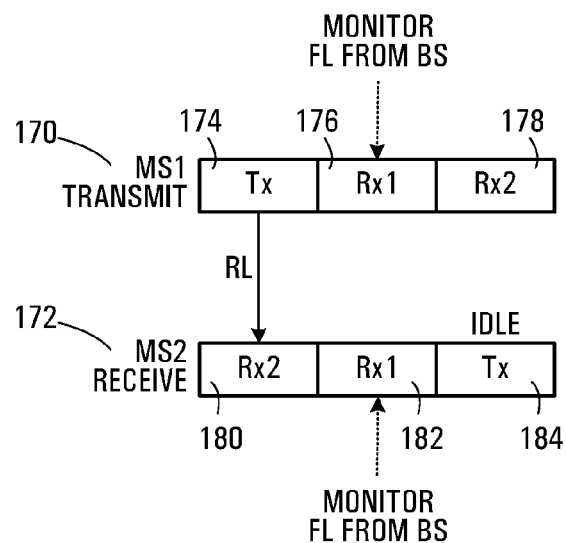
FIG. 6B is an example of a second method of monitoring BS communications.

FIGS. 6A and 6B illustrate examples of behavior of two MSs when in P2P transmit or receive mode. Two different examples of behaviour will be given, one for the case where the mobile stations have software defined receivers, as described previously with respect to FIG. 3B, and another for use in the case where receivers have separate receiver hardware for P2P mode communications and PMP mode communications, as described previously with respect to FIG. 3C. In FIG. 6A, two MSs 150,152 each have a respective single software defined receiver 154,156 which can adapt to receiving either FL (cellular) or RL (P2P). While an MS in P2P transmit mode can still receive the FL, an MS in P2P receive mode cannot do so. In the example of FIG. 6A, mobile station 152 is in transmit mode, and it has its software defined receiver 156 tuned to monitor the forward link from the base station as indicated at 158. At the same time, the mobile station 150 has its software defined receiver 154 tuned to listen to reverse link transmissions from the other mobile station 152. Because of this it is unable to listen to the forward link from the base station. Mobile station 152 has an active transmitter while the transmitter 162 of mobile station 150 is idle. These roles all reverse in a time division duplex manner such that during the next time slot, the mobile station 150 is capable of monitoring the forward link from the base station and the software defined radio of mobile station 152 is listening to the transmissions of the other mobile station 150 and as such is unable to listen to the base station. In another embodiment a slotted mode, described below, is provided as a solution to enable the receiving MS to still monitor the cellular channel.

In the example of FIG. 6B, the two mobile stations 170,172 have respective transmitters 174,184, have respective receivers 176,182 for cellular mode communications (i.e. PMP mode) and have respective receivers 178,180 for P2P mode communications. Advantageously, with this embodiment, the FL receive chain can continuously monitor the FL channel from the BS, in which case the above-referenced slotted mode of P2P transmission is not necessary.

One manner of realizing a slotted mode operation so as to enable the P2P receiving MS to perform dormant/standby state maintenance functions (e.g., monitor paging channel) is to introduce a super-frame structure, where a fraction of this super-frame is used for P2P operation.

Figure 7:
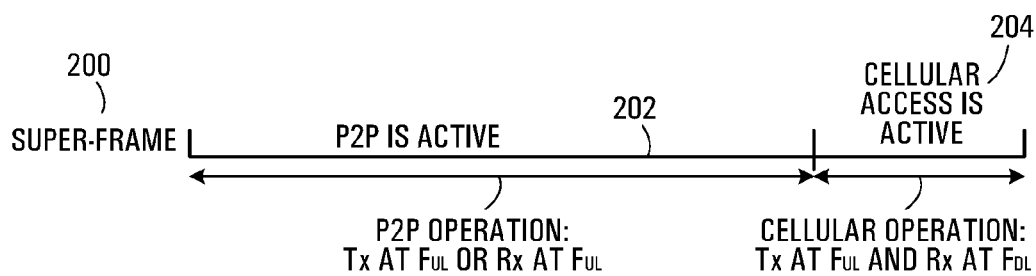
FIG. 7 shows a super-frame structure providing a third method of monitoring BS communications.

FIG. 7 illustrates an example of a super-frame structure for enabling the monitoring of the cellular channel when in P2P mode. The super frame structure 200 of FIG. 7 has two periods, a first period 202 during which P2P communications are enabled, and a second period 204 during which regular cellular operations are enabled. The P2P operation may be throttled by the paging needs of the receiving MS, and thus P2P operation may be interrupted once every paging period. Preferably, a paging request from the BS to the MS will result in an access channel message exchange between the 2 MSs to pause the P2P operation, so as to respond immediately to the page and initiate a cellular conversation.

Achieving Synchronization In P2P Mode

In TDD, mobile stations send and receive alternatively; each mobile station gets a chance to transmit during which, in some embodiments, it can listen to the base station (Forward link). The time spent in Tx mode will depend on the application type and the protocol it uses. Since P2P transmission is done in a time divided format on the reverse link, when a mobile station transmits in P2P mode using the RL frequency, its receiver can listen to the base station (FL frequency) for synchronization.

For example, assume MS A initiates the P2P connection and starts transmission to MS B. MS A's receiver still can listen to the base station using the FL frequency and will continue to maintain synchronization. MS B's receiver changes from FL Rx mode to RL Rx mode MS B will only lose synchronization if it operates on P2P Rx mode for a long duration.

Additionally, while MS A is transmitting on the regular RL and remains synchronized by listening on the FL, MS B can use MS A as an alternate frequency reference. This depends on MS Tx timing within necessary tolerance, and MS keeping track of 2 timing offsets (system and peer).

Power And Rate Control

Cellular systems employ either rate control or power control for the BS-MS link, so as to maximize spectrum efficiency and minimize interference. In some embodiments power control and/or rate control are also applied on a P2P connection.

Many options for power and/or rate control exist which are well understood by those skilled in the art. In one option, there is no power control, but rather there is simply a fixed power for P2P communications. Either a fixed modulation and code is used or Adaptive Modulation and Coding (AMC) is employed for rate control. In another embodiment, rate control has a fixed initial rate which is conservatively selected, and this is followed by an open loop type of quality measurement upon which rate control adjustments are employed. In another embodiment, slow power control is employed. Full power control as in the cellular communications systems may alternatively be employed. A combination of rate control and power control may be employed in which allocated power (allocated for example on the basis of closed loop power control) is used in conjunction with rate control.

Link Reliability and Interference

In the independent mode, the P2P link reliability may be maintained in some embodiments by MS measuring the interference levels before entering P2P mode to decide whether to transition into P2P mode and also; during P2P mode, to decide whether to perform discontinuous transmission (DTX) or to switch back to PMP.

In some embodiments, power and/or rate control are employed, and P2P mode is entered only when proper proximity of users is available.

It is noted that low power transmission within a conference room or contained area may cause negligible RL interference at the cell site. However, a strong nearby interference will limit P2P operation.

In the network controlled mode, the BS may assign the transmit power level as a grant for P2P operation. Since the transmission is managed by the BS, there is no expected operational impact on the system.

The described embodiments assume cellular connectivity is maintained even while in independent P2P mode. The cellular connectivity is used for maintaining synchronization and also to service cellular calls.

In another embodiment, P2P mode can also be considered as working independent of the cellular mode to support public safety and emergency calls or calls outside the cellular range. To support this application, a model is employed which enables P2P MSs to operate in a master-slave relationship with some form of sync messaging, such as by using a modified pilot channel, or the use of a frame format with a specific data sequence to identify the start of a frame. This mode of operation may be enabled by manually entering a separate mode where synchronization is established locally rather than with the help of network control. Alternately, GPS availability in mobile stations will enable the maintenance of sync without connectivity to the cellular network.

For P2P to operate completely independent of the cellular network, but still utilize the licensed cellular spectrum, there may be issues with respect to operation in licensed cellular bands in regions that the operator does not necessarily own or have roaming agreement with.

Support of multiple service instances may need special considerations for P2P operation. If we use the simple state transition diagram described above, the system can go to P2P mode only when both PMP sessions are in dormant or standby mode. However, with a more efficient MAC state design, P2P may be implemented with a relative priority assigned to transmissions in each mode. For example, P2P may be operated on a best-effort basis or all of some of the PMP services may operate on the best effort basis, etc.

Example of Independent Mode Specific to CDMA System

The example begins with one or more users switching voluntarily to P2P mode for file exchange and listen to P2P access channel.

Preferably, a universal access channel (P2P access channel, shared by all cells) is dedicated to P2P operation. A CDMA long code mask and a power limit of this channel is broadcast by the network (for example by BSs) to all MSs.

All MSs involved in P2P operation listen to the P2P access channel and attempt to check if there is a setup request for it.

Collision is possible for this P2P operation and preferably some kind of collision resolution is provided (e.g., back off). The P2P data can be transmitted after a negotiation for example as in 802.16.

The P2P access channel is then used for initial setup and exchange of a private long code MASK specifically used by the group of P2P MSs. This allows the P2P communications to be distinguished from PMP communications.

After successful P2P handshake, P2P MSs exchange data on the uplink frequencies with the specifically agreed private long code mask. The power level for the P2P operation may be a network parameter set to be at some very low value so as to minimize interference from P2P operation. Preferably, some simple form of rate control and/or power control can be implemented to manage the link more efficiently.

In order to receive the CDMA P2P signal, a MS searches the P2P access channel by using a searching window which might, for example, span up to $2 \times T_{one\text{-}way\text{-}delay}$ centered on the action time Note: $T_{one\text{-}way\text{-}delay}$ is the maximum one-way delay determined by the cell size;

Multiple search windows may be maintained in a table lookup if multicast mode is used.

Preferably MSs periodically (determined by PMP state) return to PMP mode for PMP link maintenance.

For example a super-frame structure such as described above may be defined and a fraction of this super-frame is used for P2P operation. This is to enable the MS to perform its dormant/standby state maintenance functions (e.g., monitor paging channel).

Example of a Network Controlled Mode Specific to CDMA System

A CDMA BS identifies two MSs within its cell that are exchanging data and decides to attempt transfer to P2P mode. The BS notifies both MSs to attempt P2P link on an assigned P2P access channel and continues processing the MSs data while it waits for MS response. If both MSs successfully complete the handshake, the MSs report a success. The BS sends a P2P-ACK which indicates to MSs they can continue their communication on the P2P link. BS may allocate nominally higher transmit power level for specific P2P operation. MSs move to dormant/standby state on the PMP link, and switch transmissions to the P2P link. Communication continues as in independent mode. Search window operation and PMP link maintenance may be performed as with independent mode. P2P communications may be preempted by a BS message or a weakening of the P2P link, when the MSs can switch back to PMP mode. P2P and PMP message buffers are coordinated so as not to lose any data during the transitions.

While the illustrated function for a CDMA system, this does not preclude the design to be applied to other standards, such as OFDM.

In some embodiments, when the cellular subscriber powers up there is the automatic registration process to the network which performs the Authorization, Authentication and Accounting functions. Following this, independent P2P communications are also protected by the exchange of a private long code mask for the specific data exchange.

Numerous modifications and variations of the present invention are possible in light of the above teachings. It is therefore to be understood that within the scope of the appended claims, the invention may be practiced otherwise than as specifically described herein.

The invention claimed is:

1. A wireless communication device operable to participate in wireless PMP (point-to-multi-point) communications by communicating directly with a cellular base station using cellular communications signals transmitted on a cellular spectral resource, the wireless communication device being further operable to participate in wireless P2P (peer-to-peer) communications by communicating directly with another wireless communication device using signals similar in form to the cellular communications signals and using said cellular spectral resource;
wherein said cellular spectral resource comprises a downlink PMP band, and an uplink PMP band, wherein the wireless communication device is operable to participate in the wireless PMP communications using the downlink PMP band for receiving and using the uplink PMP band for transmitting, the wireless communication device being further operable to participate in the wireless P2P communications using the uplink PMP band for both transmitting and receiving the wireless P2P communications.

2. The wireless communication device of claim 1, wherein the wireless communication device is operable to participate in the wireless P2P communications using the uplink PMP band in a TDD (time division duplex) manner for both transmitting and receiving the wireless P2P communications.

3. The wireless communication device of claim 1, wherein the cellular communications signals are selected from a group consisting of CDMA (code division multiple access) signals, OFDM (orthogonal frequency division multiplexing) signals, and OFDMA (orthogonal frequency division multiple access) signals.

4. The wireless communication device of claim 1, comprising:
a transmitter operable to transmit the wireless PMP communications and the wireless P2P communications on the uplink PMP band; and
a receiver operable to receive the wireless PMP communications on the downlink PMP band and operable to receive the wireless P2P communications on the uplink PMP band.

5. The wireless communication device of claim 1, wherein the wireless communication device is operable to transition into a P2P communications mode independent of network control by directly coordinating set up of a P2P communications link with the another wireless communication device.

6. The wireless communication device of claim 1, wherein the wireless communication device is operable to coordinate the set up of a P2P communications link with the another wireless communication device by, in response to a user selection, transmitting a P2P request to the another wireless communication device on a P2P access channel.

7. The wireless communication device of claim 1, wherein the wireless communication device is operable to transition into a P2P communications mode under network control.

8. The wireless communication device of claim 7, wherein the wireless communication device is operable to transition into the P2P communications mode under network control by:
receiving a direction from the network to enter the P2P communications mode with the another wireless communication device;
in response to said direction, coordinating set up of the wireless P2P communications with the another wireless communication device; and
while in the P2P communications mode, listening to PMP transmissions from a network for maintenance purposes.

9. A method of operating a wireless communication device to participate in wireless PMP (point-to-multi-point) communications by communicating directly with a cellular base station using cellular communications signals transmitted on a cellular spectral resource, and to participate in wireless P2P (peer-to-peer) communications by communicating directly with another wireless communication device using signals similar in form to the cellular communications signals and using said cellular spectral resource, wherein said cellular spectral resource comprises a downlink PMP band and an uplink PMP band, the method comprising:
participating in the wireless PMP communications using the downlink PMP band for receiving and using the uplink PMP band for transmitting; and
participating in the wireless P2P communications using the uplink PMP band for both transmitting and receiving the wireless P2P communications.

10. The method of claim 9, wherein the step of participating in the wireless P2P communications comprises using the uplink PMP band in a TDD (time division duplex) manner for both transmitting and receiving the wireless P2P communications.

11. The method of claim 9, wherein the cellular communications signals are selected from a group consisting of CDMA (code division multiple access) signals, OFDM (orthogonal frequency division multiplexing) signals, and OFDMA (orthogonal frequency division multiple access) signals.

12. The method of claim 9, comprising transitioning into a P2P communications mode independent of network control by directly coordinating set up of a P2P communications link with the another wireless communication device.

13. The method of claim 9, comprising coordinating the set up of a P2P communications link with another wireless communication device by, in response to a user selection, transmitting a P2P request to the other wireless communication device on a P2P access channel.

14. The method of claim 9, comprising transitioning into a P2P communications mode under network control.

15. The method of claim 14, comprising transitioning into the P2P communications mode under network control by:
receiving a direction from a network to enter the P2P communications mode with another wireless communication device;
in response to said direction, coordinating set up of the wireless P2P communications with the other wireless communication device; and
while in the P2P communications mode, listening to PMP transmissions from the network for maintenance purposes.

16. A network element for a wireless communications network, comprising:
a receiver operable to receive signals from the wireless communications network;

a controller operable to determine from the received signals when a pair of wireless communication devices which are communicating with each other via a cellular spectral resource of the wireless communications network are sufficiently close for P2P (peer-to-peer) communications; and a transmitter, responsive to such determination, operable to send at least one signal to said pair of wireless communication devices to direct said pair of wireless communication devices to start communicating directly with one another using P2P communications;

wherein said cellular spectral resource comprises a downlink PMP (point to multi-point) band, and an uplink PMP band, wherein the pair of wireless communication devices are operable to participate in wireless PMP communications using the downlink PMP band for receiving and using the uplink PMP band for transmitting, the pair of wireless communication devices being further operable to participate in wireless P2P communications using the uplink PMP band for both transmitting and receiving the wireless P2P communications.

17. A cellular network, comprising at least one network element as defined in claim 16.

18. The cellular network of claim 17, wherein the at least one network element comprises a base station transceiver which is operable to determine whether a pair of wireless communication devices located in a coverage area served by the base station transceiver are sufficiently close for wireless P2P (peer-to-peer) communications.

19. The cellular network of claim 17, wherein the at least one network element comprises a base station controller and at least one base station, the base station controller being operable to control the at least one base station and operable to determine whether a pair of wireless communication devices located in a coverage area served by one or more base stations controlled by the base station controller are sufficiently close for wireless P2P communications.

* * * * *